United States Patent [19]
Constant et al.

[11] Patent Number: 5,581,463
[45] Date of Patent: *Dec. 3, 1996

[54] PAY-PER-USE ACCESS TO MULTIPLE ELECTRONIC TEST CAPABILITIES AND TESTER RESOURCES

[75] Inventors: Amanda L. Constant; David W. Webb, both of Fort Collins; Sharon E. LaTourrette, Loveland; Jeffrey C. Myers, Boulder; Katherine Z. Withers-Miklos; Kay C. Lannen, both of Fort Collins; Ted T. Turner, Loveland, all of Colo.; Amos H. Leong, Singapore, Singapore

[73] Assignee: Hewlett-Packard Co, Palo Alto, Calif.

[*] Notice: The term of this patent shall not extend beyond the expiration date of Pat. No. 5,412,575.

[21] Appl. No.: 195,435

[22] Filed: Feb. 14, 1994

Related U.S. Application Data

[63] Continuation-in-part of Ser. No. 132,987, Oct. 7, 1993, Pat. No. 5,412,575.

[51] Int. Cl.⁶ .................................................... G07B 15/00
[52] U.S. Cl. ..................... 364/464.01; 222/638; 222/639; 377/15; 377/17
[58] Field of Search ...................... 222/638, 639; 364/464.01; 377/15, 16

[56] References Cited

U.S. PATENT DOCUMENTS

| | | | |
|---|---|---|---|
| 4,168,796 | 9/1979 | Fulks et al. | 371/22.6 |
| 4,196,386 | 4/1980 | Phelps | 371/22.6 |
| 4,594,711 | 6/1986 | Thatte | 371/22.3 |
| 4,807,161 | 2/1989 | Comfort et al. | 364/550 |
| 5,412,575 | 5/1995 | Constant et al. | 364/464.01 |
| 5,481,463 | 1/1996 | Constant et al. | 364/464.01 |

*Primary Examiner*—Edward R. Cosimano

[57] ABSTRACT

A system and method for testing an electronic circuit is disclosed. The system includes a circuit board test platform having multiple electronic test capabilities and multiple hardware resources, and a pay-per-use module that is coupled to the circuit board test platform. The pay-per-use module is adapted for monitoring use of the multiple electronic test capabilities and the hardware resources of the circuit board test platform, and for debiting a number of usage credits from a usage credit pool based on the use of the multiple electronic test capabilities and the tester hardware resources.

21 Claims, 3 Drawing Sheets

PAY-PER-USE ACCESS TO MULTIPLE ELECTRONIC TEST CAPABILITIES AND TESTER RESOURCES

This is a continuation-in-part of Ser. No. 08/132,987, filed Oct. 7, 1993, U.S. Pat. No. 5,412,575.

BACKGROUND OF THE INVENTION

1. Field of the Invention

The invention relates to electronic circuit board testing and, more particularly, this invention relates to a pay-per-use system and method for controlling access to a circuit board tester.

2. Related Art

Generally, a given circuit board consists of numerous interconnected semiconductor chips, such as a microprocessor, memory chips, counter chips, control chips, analog components, etc. After circuit boards have been assembled, but before they can be used or placed into assembled products, they must be tested to verify that all required electrical connections have been properly completed and that all necessary electrical components have been attached to the board in proper position and with proper orientation. Other reasons for testing are to determine and verify whether the proper components have been used. It is also necessary to determine whether each component performs properly (i.e., in accordance with the specification). Some electrical components also may require adjustment after installation.

Automated circuit board testing is performed with the aid of a circuit board testing machine. Circuit board testing machines are well known in the art. For example, a well known series of circuit board testing machines is the Hewlett-Packard Company Model HP-3070 Family of Circuit Board Testers. Testers in the HP-3070 family, for instance, have pins (the number of pins used depends upon the board being tested) which can simultaneously, selectively connect to various pins of a given circuit board for measuring components of the board. The HP-3070 Family of board testers are fully described in the HP 3070 Family Operating and Service Manuals available from Hewlett-Packard Company.

There are a variety of other circuit board testers which are commercially available. The type of circuit board tester and the tester configuration utilized depends on the type of test that must be performed upon the circuit board and the size of the circuit board. For example, an HP-3072U circuit board tester is used to perform a simple analog test on an analog circuit board or SMT open testing using HP-TestJet software. A test that entails standard in-circuit analog testing, simple digital in-circuit testing, or analog functional testing, requires an HP-3072P circuit board tester. If more complex digital in-circuit testing is required, an HP 3073 circuit board tester with additional HybridPlus-6 cards and additional in-circuit software is required. Finally, if standard in-circuit digital and analog testing, analog functional testing, digital backtracing, fault dictionary testing, and timing set testing is required, an HP 3075 circuit board tester with HybridPlus-6 cards and combinational software is utilized. Any of the above circuit board testers can be purchased with from one to four modules of pin cards, with up to nine pin cards per module, providing different total node capacity for the system. The configuration of the circuit board tester (number of modules and pin cards) depends on the size of the largest board that must be tested. For example, a high node count board might require a three or four module HP 3070 Family tester, while a smaller low node count board might only require a one or two module HP 3070 Family tester. All of the above circuit board testers are available from Hewlett-Packard Co., Palo Alto, Calif.

The cost of a particular circuit board tester is a function of the type of tests it can perform and the size of the largest board which can be tested. Different board types will require different capabilities and tester resources. A manufacturer involved in building and testing many different types of boards will require much more capability and resources in a circuit board tester than any one particular board needs. As such, it is not cost-effective to maintain a stock of circuit board testers, all of which are capable of performing the most complex testing on the largest boards.

The circuit board manufacturing and testing business is highly competitive. Test resources must be utilized in the most efficient way possible in order for a company to be competitive. Paying for equipment that sits on the production floor but it infrequently used is not an efficient use of resources. However, turning down business opportunities because of lack of test capabilities or tester resources does not lead to new opportunities.

This places many manufacturers in a difficult position when it comes to board test hardware. They would like to have full combinational tester functionality (i.e., HP 3075 functionality) on a system with enough modules and pin cards to perform complex testing at any given time on a variety of board sizes, or to appeal to the widest range of customers. At the same time, they often cannot afford the capital investment of a full combinational tester with the node capacity for their largest boards. For example, a contract manufacturer may have only one customer out of ten that needs combinational test capabilities or needs a high node count board tested. The remaining nine customers may only require in-circuit functionality to test their boards and their boards may easily fit on a one or two module tester. The contract manufacturer would like to accommodate all ten customers, but cannot justify the cost of a three or four module combinational tester when the more complex level of test and the higher node count is only required ten percent of the time.

Conventional solutions have focused on price/performance solutions relative to specific circuit board test systems. In these solutions, either the performance or the pricing of the circuit board test system is adjusted to meet the specific market demands. This is a good "point" solution. However, electronics manufacturers today face a broad spectrum of faults produced across a broad spectrum of circuit board complexities using a broad spectrum of manufacturing technologies on a broad spectrum of board sizes. A point solution is inadequate to meet these needs. Point solutions result in duplication of similar but not the same test equipment, multi-vendor test solutions, multiple training requirements, multiple service and support vendors and contracts—all of this leading to a higher cost of test.

Consequently, what is needed is a system that will allow manufacturers to have access to multiple electronic testing capabilities of a circuit board tester and the maximum necessary tester (hardware) resources, without incurring the associated costs of purchasing the more expensive circuit board tester.

SUMMARY OF THE INVENTION

The invention provides a pay-per-use circuit board test system that is adapted to control access to multiple test capabilities and hardware resources of a single circuit board tester. A pay-per-use access module is coupled to a circuit test system. The pay-per-use access module allows software control over hardware use and functionality of the circuit test system.

The pay-per-use access module makes several checks at circuit board initialization time. These checks will determine if the circuit board test system testhead should be operated in pay-per-use mode, and if all the required hardware is present on the circuit board tester. When a circuit board is loaded, the charge rate will be determined from both the board test capabilities being used and the tester resources required. If only the base system capabilities are used the charge rate will be zero. When the start of the circuit board test segment is detected and it has been determined that there are still usage credits available in a usage credit pool, a timer will be started. When the end of the circuit board test segment is detected, the timer will be stopped and the available usage credit pool will be decremented appropriately. The timer will also be stopped when it is determined that the tester is not actually executing tests (i.e., is paused for board removal or manual operator intervention).

The user is able to set three levels of alarms to warn of a low usage credit balance. The alarms issued will be in increasing level of urgency (status, warning, critical). The user determines the credit balances (or remaining test times) appropriate for each level of alarm. When the pool of available usage credits is empty, a fourth alarm will be issued at the critical level, and no additional boards will be permitted to start testing.

During board test execution, statistics will be kept pertaining to the charge level of tests being executed and the usage credits expended. This information will be available to the user in report form.

Pay-per-use access allows electronics manufacturers to buy high-performance high node count test hardware for low-performance low node count entry prices. Only when incremental performance and tester resources are required is the manufacturer charged for the capability. This is managed on a board-by-board basis. With only one test platform to maintain, electronics manufacturers can lower their overall cost of test by reducing hardware and software contract liabilities, having consistent training requirements for every test engineer, and standardizing test operator procedures, to name a new.

BRIEF DESCRIPTION OF THE FIGURES

The above and other features and advantages of the invention will be better understood by reading the following, more particular description of the invention, presented in conjunction with the following drawings, wherein.

DETAILED DESCRIPTION OF THE PREFERRED EMBODIMENTS

Figure 1:
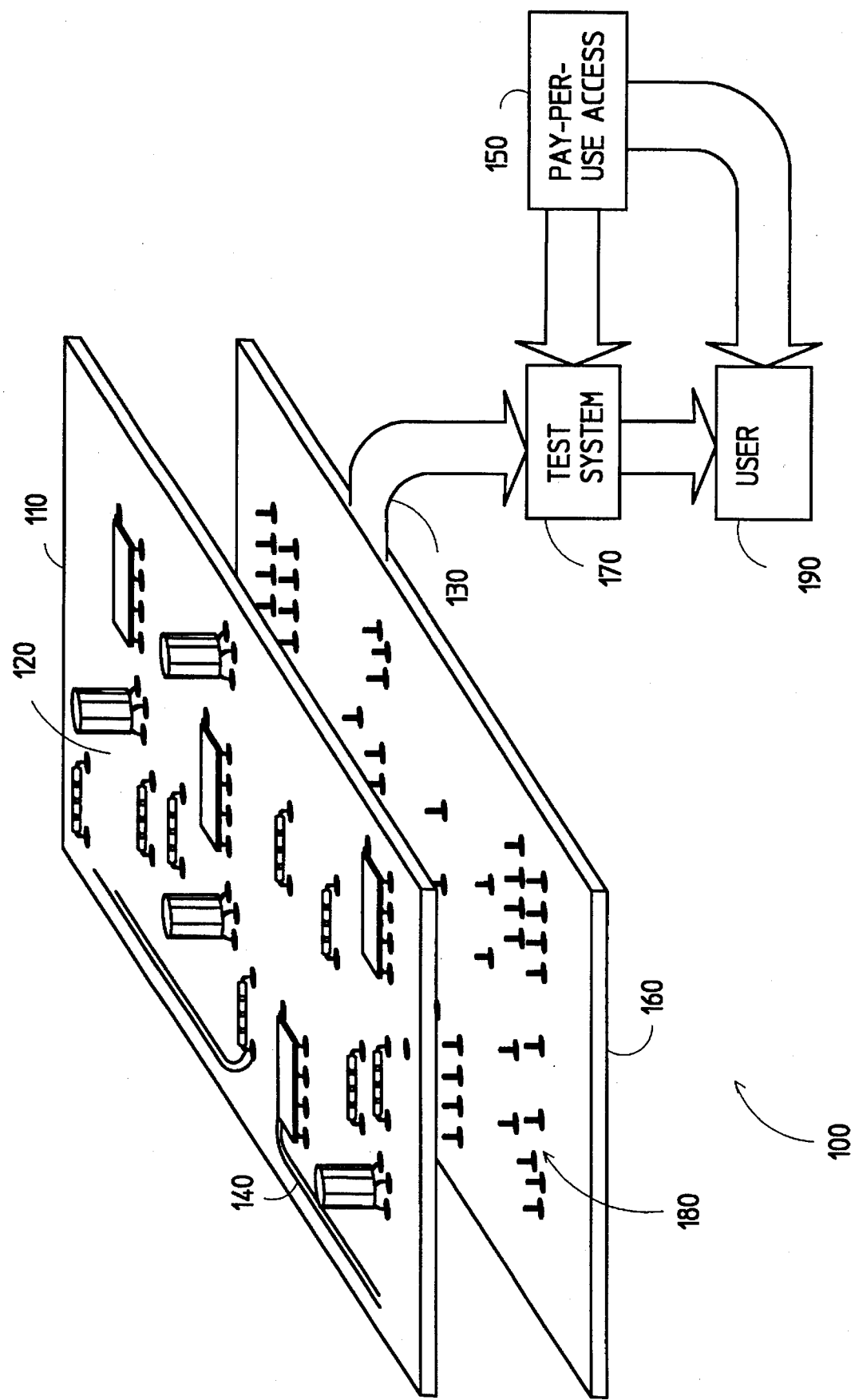
FIG. 1 illustrates a high level schematic diagram of a circuit board test system.

Referring to FIG. 1, the invention provides a pay-per-use circuit board test system 100 that is adapted to control access to the multiple test capabilities, multiple hardware resources, and multiple pattern speeds of a single circuit board tester. The circuit board testers used in a preferred embodiment are the HP 3075 and HP 3175 circuit board testers.

Examples of the multiple test capabilities of the HP 3075 and HP 3175 circuit board testers are standard in-circuit digital and analog testing, analog functional testing, service mount technology (SMT) open testing, digital backtracing, fault dictionary testing, and timing set testing. Testers with these capabilities are referred to as combinational testers.

In general terms, a circuit board tester has a plurality of connector-pins that function to contact conductors at predetermined locations to apply test signals and detect responses at specific nodes on a printed circuit board. A node is a point in a circuit where two or more parts are connected. The circuit board tester also includes the necessary signal generators and signal-processing equipment to perform the testing operations and analysis.

The term node count is used to describe the number of specific nodes on a circuit board which require testing. Higher node count boards will require a tester with more connector-pins. The term "pin card" is used herein as a general description of a piece of hardware which applies test signals and detects responses during a circuit board test. All pin cards do not have the same number of connector-pins on them. A tester will also have a processor which coordinates the activities of the pin cards. The term "module" is used herein as a general description of on or more pin cards which operate under a single processor. Modules on the HP3070 and HP3175 testers can hold up to nine pin cards. The HP3075 circuit board tester can have up to four modules. The HP3175 circuit board tester can have up to two modules. The number of modules and pin cards which a tester has determines the maximum number of nodes which can be tested on a circuit board. The cost of a tester increases with the number of modules and pin cards it contains, so manufacturers will attempt to limit the number of modules and pin cards to the minimum required to test their largest boards.

During the testing of a circuit board, not all nodes are tested. The nodes that are actually tested are referred to as the "probed nodes." Additionally, during the testing of a circuit board, not all pins from a pin card are used during the testing phase. The term "wired pins" is used to designate the pins that are actually used during testing. As will be discussed in more detail below, pay-per-use can be determined based on the number of probed nodes, the number of wired pins, or both.

In this disclosure the term testing capabilities refers to general software capabilities of the tester. As will become apparent to one skilled in the art, the present invention contemplates software capabilities other than software for testing circuit boards. Moreover, the term hardware resources refers to the hardware components or resources that are attached to the tester (e.g., modules, pin cards, etc.). As will become apparent to one skilled in the art, the present invention contemplates applying the pay-per-use concept to hardware components other than modules, pin cards, and tester speed capabilities.

There are several types of manufacturers that can benefit from use of the present invention. One type is a board manufacturer that builds and tests their own circuit boards. Another is a contract testing house that performs circuit board testing for other companies that manufacture circuit boards. Yet another is a contract manufacturer that builds and tests circuit boards for other companies. These types of manufacturers are referred to generally below by the term manufacturer.

The invention provides a software interface combined with the combinational tester hardware. That is, the pay-per-use system of the present invention is interfaced with a single test platform. It controls access to the multiple testing capabilities and resources of the single test platform by managing a pool of usage credits. The pay-per-use system is adapted to monitor use of the multiple testing capabilities and tester resources, and to debit a number of usage credits from a usage credit pool based on the use of the multiple electronic test capabilities and tester (hardware) resources.

For example, a manufacturer purchases a combinational circuit board tester (i.e., a tester with multiple capabilities) with four full modules of pin cards and a pool of usage credits. However, the combinational circuit board tester has been adapted to only provide access to lower level capabilities (e.g., standard unpowered testing and SMT opens testing) without incurring additional charges. That is, the manufacture is limited to the lower level testing capabilities of the combinational tester. Upon the debiting of usage credits in the credit pool, the user is provided with access to the higher level capabilities (e.g., the manufacture can obtain access to limited-powered testing, in-circuit testing, and combinational testing capabilities) and hardware resources. The usage credit pool will be debited at a rate appropriate to the highest level of test-functionality and tester (hardware) resource utilization employed by the board test. Usage credits will be debited as the tests are executed by the circuit board tester.

Note that although the preferred embodiment uses circuit board test equipment manufactured and sold by Hewlett-Packard, those skilled in the art will recognized that the present invention can be utilized with any type of circuit board tester. Furthermore, the present invention can be used with any hardware/platform software package that has more than one level of functionality.

FIG. 1 shows a high level schematic view of a circuit board tester 100 operated in accordance with the present invention. Printed circuit board 110 has a plurality of both analog and digital components 120 connected by way of their component leads to a plurality of conductors 140 to form a circuit on the printed circuit board 110. Test bed 160 has a plurality of connector-pins 180 that function to contact conductors 140 at predetermined locations to apply test signals and detect responses at predetermined locations within printed circuit board 110. Conductors 130 connect the connector pins 180 to test system 170. Test system 170 includes the necessary signal generators and signal-processing equipment to perform the testing operations and analysis, and provide information to the user 190. The information indicates the test results for printed circuit board 110.

The test system 170 is loaded with a testplan which provides supervisory control over testing. This includes, for example, sequencing the tests, logging the results, controlling board/fixture interfacing, controlling the test power supplies, etc. That is, the testplan is a program that controls the execution of tests in the circuit board tester 100.

A pay-per-use access module 150 is coupled to the test system 170. The pay-per-use access module 150 makes several checks at circuit board initialization time. These checks will determine if the circuit board tester 100 should be operated in pay-per-use mode, and if all the required hardware is present on the circuit board tester 100. When circuit board information is loaded into the testhead 160, the charge rate (i.e., number of credits per unit time) will be determined from the board test capabilities being used and the amount of tester resources required to accommodate the board. When the start of a circuit board test segment is detected via a start test function and it has been determined that there are still usage credits available in a usage credit pool, a timer will be started. When the end of a circuit board test segment is detected via a stop test function, the timer will be stopped and the available usage credit pool will be decremented appropriately. The timer will also be stopped when it is determined that the tester is not actually executing tests (e.g., paused for board removal or data entry). This functionality will be described in greater detail below.

Figure 3B:
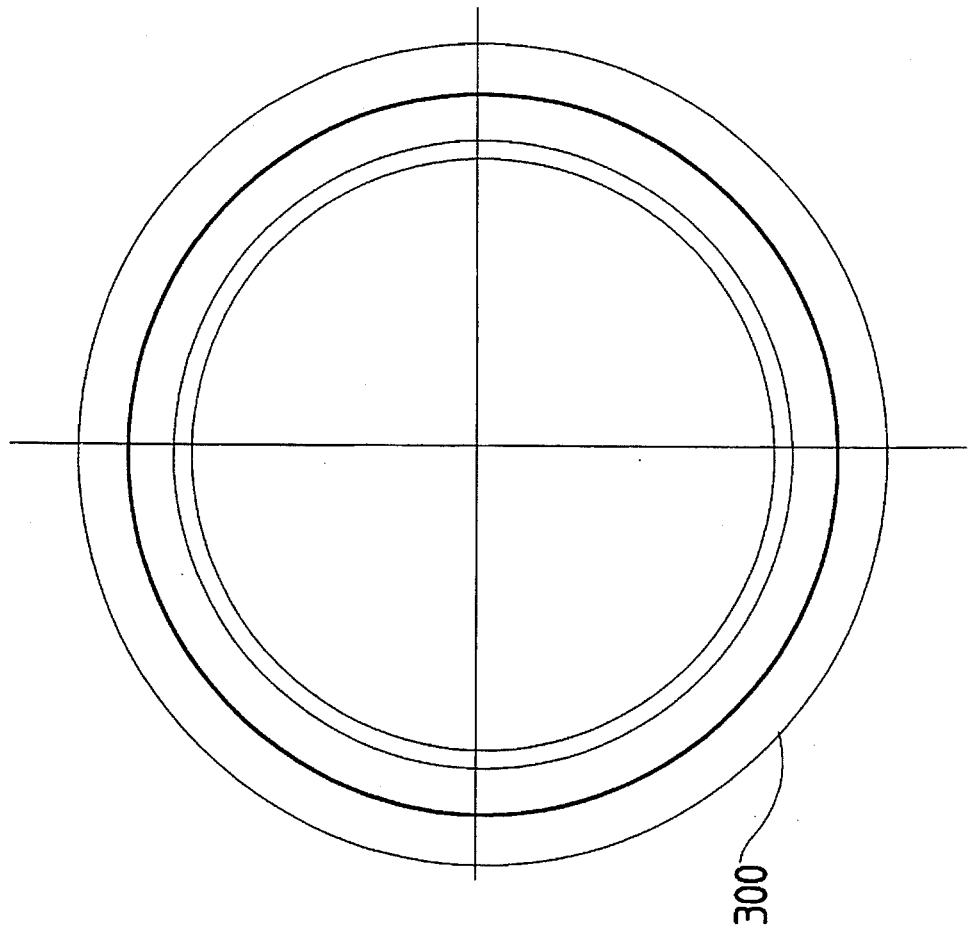
FIGS. 3A and 3B illustrate a side view and a front view, respectively of an authorization button.
Figure 3A:
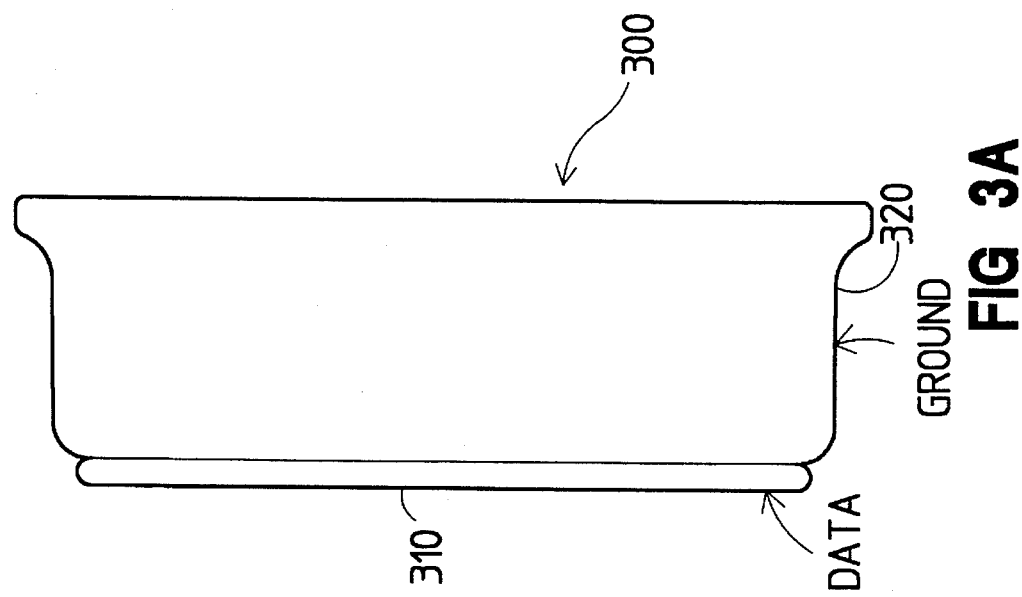

Referring to FIGS. 3A and 3B, an authorization button 300 is used for credit counting (i.e., pay-per-use access of the test system 170), as well as other aspects of system security. FIG. 3A illustrates a side view of the authorization button 300 and FIG. 3B illustrates a front view of authorization button 300. The authorization button 300 is a secure microchip that controls execution rights to the test system 170. That is, the authorization button 300 controls the right to execute rather than the right to copy the software.

Generally, authorization buttons are inexpensive commercial devices which are inserted in a button holder (not shown) attached to the serial or parallel port-through which they are accessed by software applications. The I/O port may remain usable by other applications and the operating system. In a preferred embodiment, the authorization button 300 is loaded with the minimum credit purchase amount (e.g., 50,000 units). The authorization button 300 is not locked to any particular customer or to any particular hardware. That is, customers can move them from testhead to testhead without penalty.

Testplans requiring more than the minimum test capabilities or hardware resources of the tester will run only when the authorization button 300 has at least some remaining credits. When a testplan segment completes (i.e., a stop timing point has been reached), the appropriate number of credits will be deducted from the authorization button 300.

Some button holders can carry more than one button. If multiple credit buttons are loaded, when one is empty, a message will appear on the green indicating that the next button is being switched to and that the user should make sure that the empty button is replaced. As long as credits remain, a circuit board test will be allowed to begin. If all remaining credits (on all buttons) are depleted during a test, no additional circuit board tests are permitted until a new button is inserted into the button holder. The tester will operate only at the minimum functionality level (e.g., unpowered tester) if no authorization button 300 is found or no credits are contained in the authorization button 300.

Button access routines provide the ability to read the current credit balance on the button and write a new balance to the button, as well as verify system security.

The preferred embodiment uses an authorization button manufactured by Dallas Semiconductor of Dallas, Tex. The authorization button 300 is packaged in tamper-proof, 16 mm stainless steel container. Physical tampering with the authorization button 300 will destroy its contents, rendering it useless. The authorization button 300 used in a preferred embodiment contains password protected nonvolatile read/write memory. This provide the ability to update information (i.e., credit information) when it is in the field at the end user site (i.e., chip manufacturer or contract manufacturer).

In a preferred embodiment, the authorization button 300 is interfaced to the tester via a DS141 button holder (not shown) also available from Dallas Semiconductor.

Referring to FIG. 3A, communication with the authorization button 300 is via a consistent 1-wire interface. The button 310 of the authorization button 300 is the data pin and the flange 320 is ground. Dialogue with the authorization button 300 is via a pulse-width modulation protocol. An application programming interface (not shown), provided by Dallas Semiconductor, provides the link between the pay-per-use system access module 150 and the authorization button 300. The access software manages the 1-wire interface and identifies all authorization buttons present on the port. Additional information regarding the access software can be found in the DS141xK Button Developer's Kit available from Dallas Semiconductor. Additional documentation on the authorization button 300 is also available from Dallas Semiconductor.

Applying the pay-per-use model to multiple hardware resources involves charging the user based on the hardware required for testing a particular circuit board. There are several ways the hardware resources can be counted. In one embodiment, the number of pin cards used for a particular board are counted. In another embodiment, the total number of connector-pins on the cards used are counted. In yet another embodiment, only the number of wired connector-pins on the card used are counted. In another embodiment, the total number of nodes on the circuit board are counted. In another embodiment, only the number of tested nodes on the circuit board are counted. In yet another embodiment, the number of modules required to test a particular circuit board are counted. In a preferred embodiment, the count (determined using one of the methods described above) is used either alone or in conjunction with other tester features to determine a charge rate in a pay-par-use model of operation.

Circuit board testers may have the ability to apply vectors (or patterns) in a digital test at different speeds. For example, the HP3075 and HP3175 testers can apply patterns at 6 MHz, 12 MHz, or 20 MHz. In an alternate embodiment, this pattern rate is used either alone or in conjunction with other tester features to determine a charge rate in a pay-per-use model of operation.

The pay-per-use circuit board test system 100 can be implemented two ways. The first is to require the manufacture to pay in advance for a block of usage credits which would equate to a specific amount of test time available in each of the three incremental charge modes. Note that although three sets of incremental charge modes are used in the preferred embodiment, the present invention is not limited to any number or number of sets of incremental charge modes. The second is to meter the usage of the tester in each of the four sets of incremental charge modes, and to bill the customer periodically. In a preferred embodiment, the pay-in advance scenario is implemented, and is described in detail below.

The pay-per-use circuit board test system 100 can also be implemented using a scheme of counting the number of times selected tests are executed, (rather than timing tester usage) and deducting credits based upon the number of tests and the level of capability and hardware resources employed in the tests. In a preferred embodiment, the timer scenario is implemented, and is described in detail below.

Figure 2:
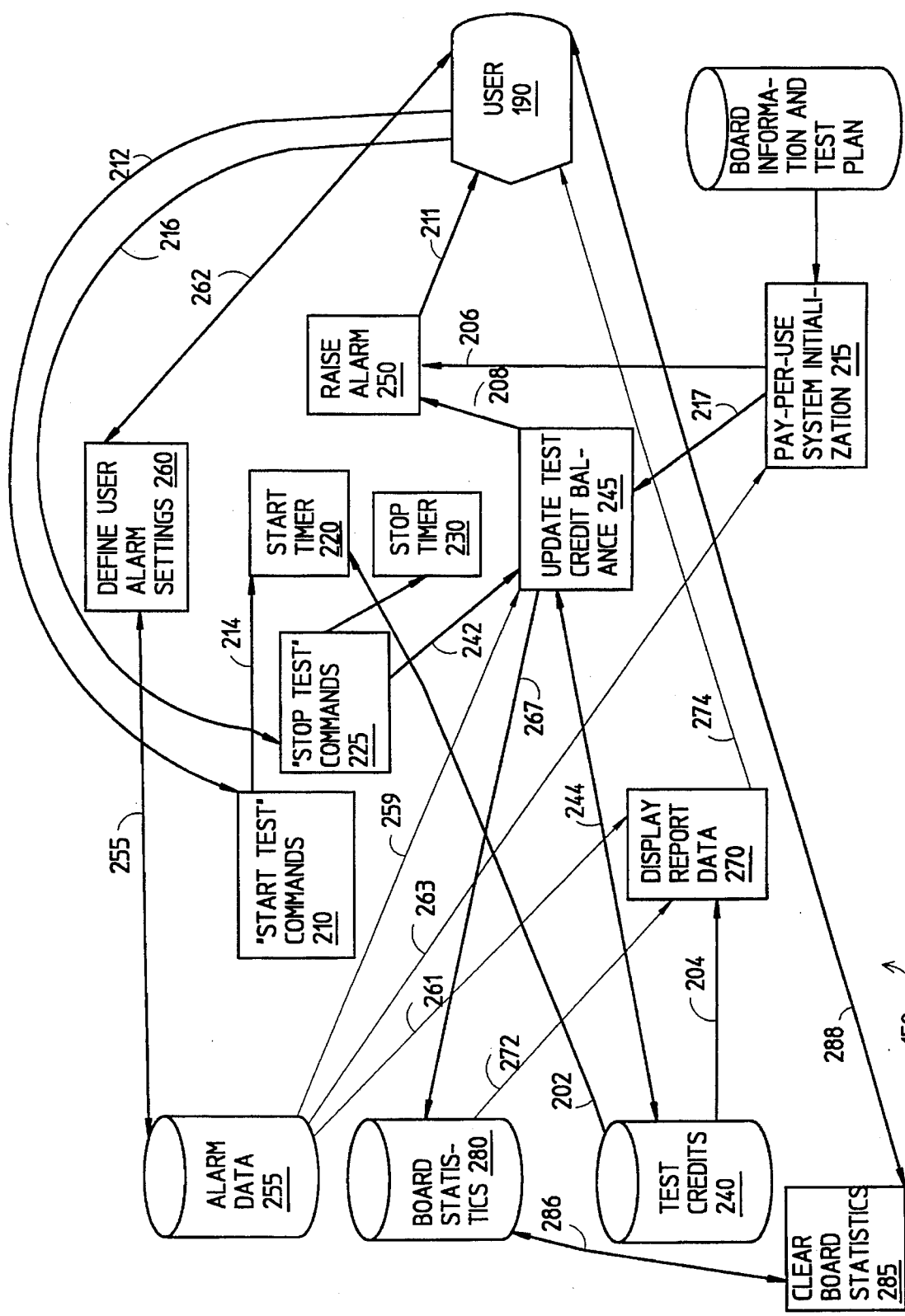
FIG. 2 illustrates a block diagram of a pay-per-use test system 100 which is coupled to the circuit board test hardware.

FIG. 2 shows a detailed block diagram of the pay-per-use access system 150. The user 190 has access to the different capabilities of the pay-per-use system 150, and accesses these capabilities via a defined set of commands (defined in the testplan).

The user loads board information and a testplan into the test system 170 when he/she is preparing to test a circuit board. Once the board information is loaded, the pay-per-use system 150 determines which capabilities and resources of the tester are required to test the circuit board.

Each hardware resource (or group of hardware resources) has an associated charge rate. Each charge rate is broken into different charge levels depending on the level of testing used. The present invention provides four levels of testing: (1) unpowered tests, (2) simple limited-powered tests, (3) full in-circuit tests, and (4) combinational tests, and four rate sets based on the number of tester resources utilized. (Note that in a preferred embodiment there is no charge associated with an unpowered test). The charge level for the entire board is based on the highest capabilities used (as determined by the board description information) and the number of tester resources used. In other words, the pay-per-use system 150 determines the number of tester resources used in the board test and from this information, determines which charge rate will be used. It then looks at the test capabilities being employed and sets the charge level appropriately from the selected charge rate. This charge level is stored in the pay-per-use system initialization module 2 15. The update usage credit balance module 245 (hereinafter balance module 245) is updated with the current charge level via connection 217 during pay-per use software initialization.

Once the charge level has been determined and the circuit board has been loaded, the user initiates the circuit board test by executing (via line 212) a "start test" command 210. This command triggers (via line 214) the start of a timer, as shown in module 220.

The start module 220 has access to the usage credit pool 240 via line 202. The usage credit pool stores the available usage credits. The start module 220 is configured to prevent the beginning of a chargeable circuit board test if there are not enough usage credits available in the usage credit pool 240. The current contents of the usage credit pool 240 can be provided to a display report module 270 via line 204. This information can then be accessed by the user.

The timer maintains a record of the amount of time that has elapsed during the testing of the circuit board. The timer can be stopped (via line 218) by the user by executing (via line 216) a "stop test" command 225, such as a "pause" or "break" or "exit" command, as shown in module 230. Once one of the stop test commands 225 has been executed, the tester is idle and the timer has stopped timing the testing. That is, the pay-per-use system 150 is not deducting credits from the usage credit pool 240.

The stop test command stops the timer as indicated in block 230. Once the timer is stopped, the balance module 245 is accessed (via line 242) and the user's usage credits are updated. As discussed above, the balance module 245 has previously been updated with the current charge level by module 215 during system initialization. The balance module 245 accesses the usage credits pool 240, via a bidirectional line 244, to calculate the updated usage credit balance.

In particular, the balance module 245 calculates the updated balance by multiplying the charge level with the total elapsed time in the timer. This number is subtracted from the usage credit total stored in the usage credits pool 240 which results in the updated balance. The updated balance is then stored back into the usage credit pool 240. Furthermore, the updated balance is also provided to the board statistics module 280 (described below) via line 267. If a start test command 210 is subsequently executed, the timer is once again started, and the testing of the circuit board can continue. The pay-per-use system 150 only charges for time while the tester is actively testing the circuit board. Idle time for changing boards or dam entry is not charged to the user.

The pay-per-use system 150 also provides a status alarm 250. In a preferred embodiment, the alarm is programmed to provide three default alarm levels. The user can change the default alarm levels via an application program 260. This is indicated by line 262. The changes are then stored via line 256 to the alarm data file 255.

Regardless of how the alarm levels are set (i.e., default or user defined), the alarm levels are stored in alarm data file 255. The alarm file 255 provides this information to the balance credit module 245 via line 259, the report module 270 via 261, and the initialization module 215 via line 263.

The first level alarm is referred to as a status alarm. The status alarm indicates that the number of credits has reached a first alarm level (e.g., 40 hours of usage credits left). As such, the number of usage credits should be increased as soon as possible. The second level alarm is referred to as a warning alarm. The warning alarm signals when the number of credits has reached a second alarm level (e.g., 20 hours of usage credits left). The third, and final, alarm level is referred to as a critical alarm. In a preferred embodiment, the critical alarm signals when the number of credits is slightly greater than the number of credits needed to operate the tester for one shift (e.g., slightly greater than 8 hours).

The number of credits equating to an hour worth of usage will be determined by the charge level of the circuit board currently being tested when the alarm is triggered.

In a preferred embodiment, the pay-per-use system 150 is programmed to alert the user (via line 211) when alarm levels are reached. The particular warning level is displayed to the user 190 with a unique color. The pay-per-user test system 150 checks for alarm conditions after either initializing the pay-per-use system software or after performing a balance update. During initialization the alarm file is checked via line 206 and during a balance update it is checked via line 208.

In a preferred embodiment, the system allows for the installation of a "spare tank" of credits. This allows the testing to continue on the "spare tank" button (not shown) while the replacement for the empty button is purchased and installed. However, there must always be a positive balance of credits to begin or continue testing at incremental levels.

Also in a preferred embodiment, the run-time test system 170 receives information about the authorization credit button 300. The run-time software (not shown) will halt with an exception if the pay-per-use access system 150 is disconnected from the authorization credit button 300, if the adaptor which the authorization button 300 plugs into is missing, or if the authorization button 300 is empty. Note that in a preferred embodiment, if an "unpowered only" testplan is being executed (i.e., does not use tests which debit the credit pool), the pay-per-use system 150 does not require that an authorization button to be attached to the test system 170.

To safeguard against a manufacturer trying to override or disconnect access to the authorization button 300 during a balance update, the present invention implements a "pending update" scheme for security purposes. The pending update is implemented if a balance update is attempted and the pay-per-use system 150 does not detect that an authorization button is connected to the test system 170. The pay-per-use system 150 will save the update information until a new start command is given, at which point the pay-per-use system will update the credit balance in the re-attached authorization button 300 before allowing testing to resume.

The final set of modules within the pay-per-use test system 150 centers around circuit board testing statistics. All circuit board test statistics are stored in data file 280. Examples of board test statistics include the identification (ID) for a circuit board, the first date on which a board with that ID was tested, the most recent date in which a board with that ID was tested, the level of test at which the circuit board is charged, and the total number of credits which have been used to test circuit boards within that ID. All of this information is forwarded to module 270 via line 272 which compiles all the information and presents a report on the pay-per-use access system 150. The report is available to the user 190.

A clear board statistics program 285 is provided to the user 190, as shown by line 288. Program 285 allows the user to clear the board statistics data file 280 either entirely or on a board ID by board ID basis via line 286.

The report program 270 provides data on all aspects of the pay-per-use access system 150. The report program 270 provides the current date, the current usage credit balance in all credit buttons found, and the total test time remaining for each credit;button based on the current usage credit balance of that credit button. This test time data is calculated for each of the possible charge rates. The report program 270 also prints the current values of the user-definable alarm settings and the board statistics. The report program 270 provides this information to the user 190 via line 274.

In a preferred embodiment, users of the pay-per-use system are only charged for actual testing time. In other words, there will be no charge for program development, pauses for data entry during tests, system diagnostics, etc.

Security and/or integrity of the system is essential. If the credit button becomes corrupt a warning is posted and a new button will have to be inserted to continue testing. The present invention protects against customer created credit buttons by providing a proprietary access password. Without knowledge of the password, the manufacture cannot create a credit button which the pay-per-use system 150 will recognize. Thus, the manufacture will not be able to obtain access to the incremental testing capabilities of the circuit board tester. It is also essential that the pay-per-use software cannot be turned off by the customer. Furthermore, credit button security cannot be breached by intercepting transmissions to and from the port to which the authorization button 300 is attached.

Customers cannot reduce their charge level by modifying their board configuration to imply a lesser test capability or lesser hardware requirements than is actually programmed. Test objects will check at execution time to insure a match between the capabilities and hardware resources specified in the board configuration at run-time versus those specified when the test object was created.

What is unique about the pay-per-use test system 150 is that it changes how electronic manufacturers purchase test time. Primarily, pay-per-use reduces the initial capital investment and increases the on-going expense. This financial model is consistent with the way manufacturers use testers. Slightly reducing the capital cost of testers (discount, price reductions) is inadequate because the amount of reductions is limited by the loss of revenues to the test vendor. Pay-per-use creates an annuity flow of revenues allowing the initial capital cost of the test equipment to be greatly reduced, and the loss of revenue to the test vendor to be replaced over time with the annuity "expense" payments associated with actually using the test system. Pay-per-use access allows electronics manufacturers to buy high-performance, high node count test hardware for low-performance low node count entry prices. Only when incremental performance/node capacity is required is the manufacturer charged for the capability. This is managed on a board-by-board basis. With only one test platform to maintain, electronics manufacturers can lower their overall cost of test by reducing hardware and software contract liabilities, having consistent training requirements for every test engineer, and standardizing test operator procedures, to name a few.

While the preferred embodiment describes the use of tester resources along with required tester capabilities to determine the charge level for a particular board, it can be easily seen that tester resources could also be used as the sole determining factor for setting the charge level, providing unrestricted access to the other multiple electronic test capabilities of the circuit board tester.

While the invention has been particularly shown and described with reference to preferred embodiments thereof, it will be understood by those skilled in the art that various changes in form and details may be made therein without departing from the spirit and scope of the invention.

What is claimed is:

1. A system for testing an electronic circuit, comprising:
   (a) a circuit test platform having one or more hardware modules containing one or more pin cards; and
   (b) a pay-per-use module, coupled to said circuit test platform, for monitoring use of said pin cards in said hardware modules of said circuit test platform, and for debiting a number of usage credits from a usage credit pool based on said use of said pin cards in said hardware modules.

2. The system of claim 1, further comprising means for determining whether there are sufficient credits in said usage credit pool to operate at a specified level, wherein said pay-per-use module is operable at a base level that does not require said usage credit pool to be debited, and does not allow testing on said circuit test platform, other than at said base level, if there are insufficient credits in said usage credit pool.

3. The system of claim 1, further comprising one or more authorization buttons that contain said usage credit pool, wherein said one or more authorization buttons are loaded with a predefined number of credits and said usage credit pool is secured against tampering and or unauthorized user modification.

4. The system of claim 1, wherein said pay-per-use module further comprising a statistics module for storing information that relates to a circuit board test, and a report module, connected to said statistics module, that compiles all of said information and generates a report.

5. The system of claim 1, wherein said pay-per-use module comprises means for detecting the number of pins cards employed in the testing of the electronic circuit.

6. The system of claim 1, wherein said pay-per-use module further comprising means for detecting the number of hardware modules employed in the testing of the electronic circuit.

7. The system of claim 1, wherein said pay-per-use module further comprising means for detecting the number of wired pins employed in the testing of the electronic circuit.

8. The system of claim 1, wherein said pay-per-use module further comprising means for detecting the number of nodes which exist in the electronic circuit.

9. The system of claim 1, wherein said pay-per-use module further comprising means for detecting the number of probed nodes which exist in the electronic circuit.

10. The system of claim 1, wherein said circuit test platform has the ability to apply vectors to the electronic circuit at a plurality of speeds, wherein said pay-per-use module monitors mid circuit test platform and further debits a number of said usage credits from said usage credit pool based on said speed said circuit test platform is applying said vectors.

11. The system of claim 1, wherein said pay-per-use module comprises a timer that is activated by initiating a circuit test start function and is stopped by initiating a circuit test stopping function, wherein said timer maintains a record of elapsed time to perform a circuit test.

12. The system of claim 1, wherein said pay-per-use module further comprising a statistics module for storing information that relates to a circuit test, and a report module, connected to said statistics module, that compiles all of said information and generates a report.

13. The system of claim 1, wherein said pay-per-use module further comprising means for detecting the number of total pins on the pin cards employed in the testing of the electronic circuit.

14. The system of claim 13, wherein said pay-per-use module comprises:
   a counter that is incremented by initiating selected circuit tests, wherein said counter maintains a record of the number of said selected circuit tests performed by said circuit test platform;
   authorization means for storing said usage credit pool; and
   a balance module, connected to said counter and said authorization means, for calculating a deduction of usage credits based on a charge level and the number of said selected circuit tests recorded by said counter.

15. A system for testing an electronic circuit, comprising:
   (a) a circuit test platform having multiple electronic test capabilities and one or more hardware modules containing one or more pin cards; and
   (b) a pay-per-use module, coupled to said circuit test platform, for monitoring use of said multiple electronic test capabilities and said one or more pin cards in said hardware modules of said circuit test platform, and for debiting a number of usage credits from a usage credit pool based on said use of said multiple electronic test capabilities and said use of said one or more pin cards in said hardware modules.

16. A computer-implemented method for controlling access to the multiple capabilities and one or more modules of one or more pin cards of a circuit tester, the circuit tester having coupled thereto a credit pool that is loaded with a pool of usage credits, the method comprising the steps of:
   (1) initiating a circuit test segment according to a testplan;
   (2) determining from said testplan which capabilities of the circuit tester are required to perform said circuit test;
   (3) determining from said testplan which pin cards in which modules of the circuit tester are required to perform said circuit test;
   (4) determining a charge level based on said required capabilities and said required pin cards;
   (5) determining an elapsed time to perform said circuit test segment, said test segment determined by a circuit test start function and a circuit stop function;
   (6) calculating a number of usage credits to be deducted from the pool of usage credits for performing said circuit test segment based on said elapsed time and said charge level;

(7) deducting said number of usage credits from the pool of usage credits; and (8) providing a status alarm if the number of usage credits in the pool of usage credits falls below an alarm value.

17. The method of claim 16, further comprising the step of providing a report on different aspects of circuit tests.

18. The method of claim 16, further comprising the step of destroying the contents of the credit pool if tampering is detected.

19. The method of claim 16, further comprising the steps of checking to determine whether there are sufficient credits in said usage credit pool to perform said circuit test and limiting testing to at least one of said multiple test capabilities if there are insufficient credits in said credit pool.

20. A system for charging a user on a pay-per-use basis for access to the multiple capabilities and resources of a circuit tester, comprising:

(a) authorization means for storing a usage credit pool;

(b) a pay-per-use module, coupled to the circuit tester, for monitoring use of said multiple electronic test capabilities and resources of the circuit tester, and for debiting a number of usage credits from said usage credit pool based on said use of said multiple electronic test capabilities and said resources.

21. The system of claim 20, wherein said pay-per-use module comprises:

(1) a timer that is activated by initiating a circuit test start function and is stopped by initiating a circuit test stopping function, wherein said timer maintains a record of the amount of time that has elapsed during said circuit test;

(2) a balance module, connected to said timer and said authorization means, for calculating a deduction of usage credits based on a charge level and the amount of time recorded by said timer, wherein said test credit pool is reduced by said deduction; and (3) a status alarm, connected to said balance module, for indicating when the number of remaining usage credits has reached an alarm level.

\* \* \* \* \*